US011750775B2

(12) United States Patent
Nakamura et al.

(10) Patent No.: US 11,750,775 B2
(45) Date of Patent: Sep. 5, 2023

(54) OCCUPANT STATE DETECTION SYSTEM

(71) Applicant: SUBARU CORPORATION, Tokyo (JP)

(72) Inventors: Ryota Nakamura, Tokyo (JP); Tsukasa Mikuni, Tokyo (JP); Takuya Homma, Tokyo (JP); Yutaka Ishii, Tokyo (JP); Masatoshi Tsuge, Tokyo (JP); Kazuhiro Hayakawa, Tokyo (JP); Toru Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/698,349

(22) Filed: Mar. 18, 2022

(65) Prior Publication Data

US 2022/0321835 A1 Oct. 6, 2022

(30) Foreign Application Priority Data

Mar. 30, 2021 (JP) .................................. 2021-058859
Oct. 29, 2021 (JP) .................................. 2021-178196

(51) Int. Cl.
*H04N 7/18* (2006.01)
*G06V 20/59* (2022.01)
*G07C 5/02* (2006.01)

(52) U.S. Cl.
CPC ............... *H04N 7/18* (2013.01); *G06V 20/59* (2022.01); *G07C 5/02* (2013.01)

(58) Field of Classification Search
CPC ............. G06V 20/59; G07C 5/02; H04N 7/18
See application file for complete search history.

(56) References Cited

U.S. PATENT DOCUMENTS

| 2012/0200490 | A1* | 8/2012 | Inada ................... G06V 20/597 345/156 |
| 2015/0164400 | A1* | 6/2015 | Shimizu ................. G08B 21/06 600/513 |
| 2018/0348759 | A1* | 12/2018 | Freeman .............. A61N 1/3904 |
| 2019/0362167 | A1 | 11/2019 | Nakamura et al. |
| 2021/0357701 | A1* | 11/2021 | Hyuga ................... G06N 3/044 |

FOREIGN PATENT DOCUMENTS

JP      2019-202726 A    11/2019

* cited by examiner

*Primary Examiner* — Rowina J Cattungal
(74) *Attorney, Agent, or Firm* — McDermott Will & Emery LLP

(57) ABSTRACT

An occupant state detection system includes an occupant monitoring apparatus, a determination apparatus, and an occupant state detection apparatus. The occupant state detection apparatus includes one or more processors and one or more memories. The one or more memories store data including traveling-state comparative data and stopped-state comparative data. The one or more processors cooperate with one or more programs included in the one or more memories to receive occupant monitoring data from the occupant monitoring apparatus and determination data from the determination apparatus. On the basis of the determination data, the one or more processors compare the occupant monitoring data with the traveling-state comparative data on the condition that the vehicle is in the traveling state, and compare the occupant monitoring data with the stopped-state comparative data on the condition that the vehicle is in the stopped state, to detect a state of the occupant in the vehicle.

6 Claims, 14 Drawing Sheets

| DETERMINATION DATA | | | TRAVELING STATE | STOPPED STATE |
|---|---|---|---|---|
| MONITORING TARGET | | | OCCUPANT BEHAVIOR | OCCUPANT BIOLOGICAL DATA |
| OCCUPANT MONITORING DATA | BEHAVIOR | GAZE DIRECTION | ○ | |
| | | FACIAL POSE | ○ | |
| | | NUMBER OF BLINKS | ○ | |
| | | EYE APERTURE | ○ | |
| | | EYE MOVEMENT | ○ | |
| | | POSTURE | ○ | |
| | | BODY MOTION | ○ | |
| | BIOLOGICAL DATA | BLOODSTREAM | | ○ |
| | | PULSE RATE | | ○ |
| | | RESPIRATION RATE | | ○ |
| | | SLEEPING TIME | | ○ |
| | | NUMBER OF TIMES OCCUPANT TURNS OVER IN THEIR SLEEP | | ○ |
| | | RESTING TIME | | ○ |
| | | | ASSIGNMENT PROCESSING A | ASSIGNMENT PROCESSING B |

FIG. 7

| DETERMINATION DATA | | | TRAVELING STATE | STOPPED STATE |
|---|---|---|---|---|
| MONITORING TARGET | | | OCCUPANT ON DRIVER'S SEAT ↓ | OCCUPANT INSIDE WHOLE CABIN ↓ |
| OCCUPANT MONITORING DATA | BEHAVIOR | GAZE DIRECTION | ○ | |
| | | FACIAL POSE | ○ | |
| | | NUMBER OF BLINKS | ○ | |
| | | EYE APERTURE | ○ | |
| | | EYE MOVEMENT | ○ | |
| | | POSTURE | ○ | ○ |
| | | BODY MOTION | ○ | ○ |
| | | | ASSIGNMENT PROCESSING C | ASSIGNMENT PROCESSING D |

FIG. 10

| DETERMINATION DATA | | | TRAVELING STATE | STOPPED STATE |
|---|---|---|---|---|
| MONITORING TARGET | | | OCCUPANT BEHAVIOR AND BIOLOGICAL DATA | OCCUPANT BEHAVIOR |
| OCCUPANT MONITORING DATA | BEHAVIOR | GAZE DIRECTION | ○ | ○ |
| | | FACIAL POSE | ○ | ○ |
| | | NUMBER OF BLINKS | ○ | ○ |
| | | EYE APERTURE | ○ | ○ |
| | | EYE MOVEMENT | ○ | ○ |
| | | POSTURE | ○ | ○ |
| | | BODY MOTION | ○ | ○ |
| | BIOLOGICAL DATA | BLOODSTREAM | ○ | |
| | | PULSE RATE | ○ | |
| | | RESPIRATION RATE | ○ | |
| | | | ASSIGNMENT PROCESSING E | ASSIGNMENT PROCESSING F |

FIG. 13

OCCUPANT STATE DETECTION SYSTEM

CROSS-REFERENCE TO RELATED APPLICATIONS

This application claims priority from Japanese Patent Application Nos. 2021-058859 filed on Mar. 30, 2021, and 2021-178196 filed on Oct. 29, 2021, the entire contents of which are hereby incorporated by reference.

BACKGROUND

The technology relates to an occupant state detection system.

In recent years, advance has been made in developments of so-called driver monitoring systems (DMS). Driver monitoring systems monitor a driver's state for purposes of assistance with safe driving of vehicles. For example, such a driver monitoring system detects where a driver is gazing at. In a case where the driver is not aware of a current situation, the driver monitoring system gives an alarm to the driver.

Examples of this kind of apparatus include an occupant monitoring apparatus that monitors occupants including a driver. This occupant monitoring apparatus makes it possible to reduce the number of imaging devices to be used, even in a case with an increase in the number of the occupants to be monitored. For example, reference is made to Japanese Unexamined Patent Application Publication (JP-A) No. 2019-202726.

SUMMARY

An aspect of the technology provides an occupant state monitoring system including an occupant monitoring apparatus, a determination apparatus, and an occupant state detection apparatus. The occupant monitoring apparatus is configured to monitor a physical state of an occupant in a vehicle. The determination apparatus is configured to determine whether the vehicle is in a traveling state or a stopped state. The occupant state detection apparatus is configured to detect a state of the occupant in the vehicle on the basis of occupant monitoring data from the occupant monitoring apparatus. The occupant state detection apparatus includes one or more processors, and one or more memories configured to be communicably coupled to the one or more processors. The one or more memories are configured to store data including traveling-state comparative data and stopped-state comparative data. The traveling-state comparative data includes comparative data to detect the state of the occupant in the vehicle in the traveling state. The stopped-state comparative data includes comparative data to detect the state of the occupant in the vehicle in the stopped state. The one or more processors are configured to cooperate with one or more programs included in the one or more memories to: receive the occupant monitoring data and determination data from the determination apparatus; store the received occupant monitoring data in the one or more memories; and on the basis of the determination data, compare the occupant monitoring data with the traveling-state comparative data on the condition that the vehicle is in the traveling state, and compare the occupant monitoring data with the stopped-state comparative data on the condition that the vehicle is in the stopped state, to detect the state of the occupant in the vehicle.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

FIG. 7 summarizes relation of monitoring assignment processing to occupant monitoring data, in the occupant state detection system according to the second embodiment of the disclosure.

FIG. 10 summarizes relation of monitoring assignment processing to occupant monitoring data, in the occupant state detection system according to the third embodiment of the disclosure.

FIG. 13 summarizes relation of monitoring assignment processing to occupant monitoring data, in the occupant state detection system according to the fourth embodiment of the disclosure.

DETAILED DESCRIPTION

Figure 1:
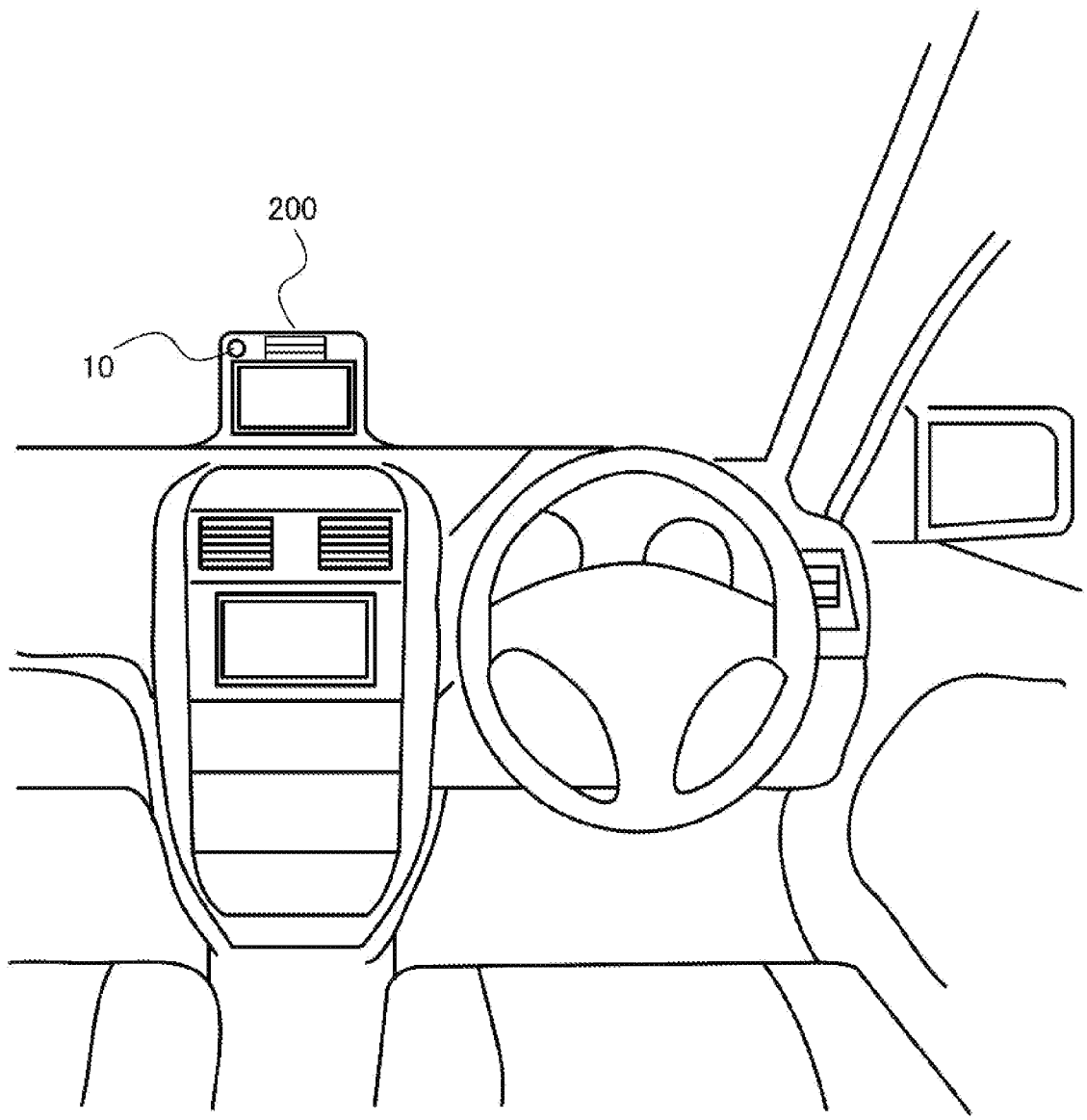
FIG. 1 illustrates a mounted state of an occupant state detection apparatus in an occupant state detection system according to a first embodiment of the disclosure.

Existing techniques as disclosed in JP-A No. 2019-202726 are intended for monitoring occupants including a driver while a vehicle is in a traveling state. The existing techniques do not include monitoring occupants including a driver of a vehicle to determine physical states of the occupants while the vehicle is in a stopped state.

The traveling state and the stopped state have considerable differences in terms of targets to be monitored by an occupant monitoring apparatus. Thus, simply applying the same occupant monitoring control as in the traveling state to the stopped state may hinder accurate detection of states of occupants.

It is desirable to provide an occupant state detection system that makes it possible to optimize a monitoring method for a vehicle in a traveling state and a monitoring method for a vehicle in a stopped state, to detect accurately a physical state of an occupant.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

The example embodiments of the technology are described below with reference to FIGS. 1 to 14.

First Embodiment

An occupant state detection system 1 according to a first embodiment is described with reference to FIGS. 1 to 4.

The occupant state detection system 1 according to this embodiment may include, without limitation, an occupant monitoring apparatus 10, a determination apparatus 100, and an occupant state detection apparatus 200. For example, as illustrated in FIG. 1, the occupant state detection apparatus 200 may be provided vehicle-widthwise halfway and vehicle-lengthwise in front of a driver's seat in a vehicle. The occupant state detection apparatus 200 is configured to receive occupant monitoring data and determination data. The occupant monitoring data is obtained by the occupant monitoring apparatus 10 described later. The determination data is received from the determination apparatus 100. On the basis of the determination data, the occupant state detection apparatus 200 is configured to compare the occupant monitoring data received, with traveling-state comparative data or stopped-state comparative data corresponding to the relevant occupant monitoring data, to detect a state of an occupant in the vehicle.

It is to be noted that a detailed configuration is described later.

<Configuration of Occupant State Detection System 1>

Figure 2:
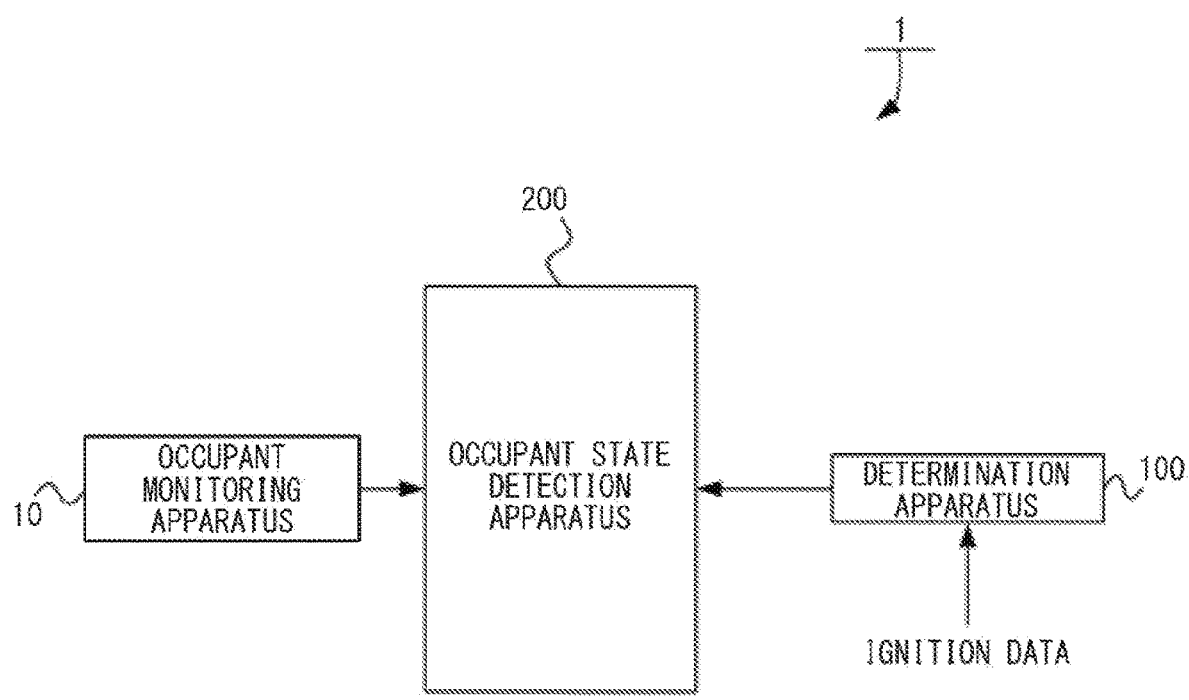
FIG. 2 is a block diagram illustrating a configuration of the occupant state detection system according to the first embodiment of the disclosure.

As illustrated in FIG. 2, the occupant state detection system 1 according to this embodiment may include, without limitation, the occupant monitoring apparatus 10, the determination apparatus 100, and the occupant state detection apparatus 200.

The occupant monitoring apparatus 10 is configured to monitor a physical state of an occupant in the vehicle with the use of, for example, a camera. The camera may incorporate an imaging element such as a CCD (Charge Coupled Device) or a CIS (CMOS Image Sensor), and acquire an image of an occupant in the vehicle captured by the imaging element. The image of an occupant in the vehicle may include a moving image and a still image.

The camera of the occupant monitoring apparatus 10 may be a dedicated camera. In one example, in a case where the occupant state detection system 1 includes an occupant recognition apparatus, a camera in the occupant recognition apparatus may serve as the camera of the occupant monitoring apparatus 10. In one example, the camera of the occupant monitoring apparatus 10 may include both an optical camera and a near-infrared camera.

In the occupant state detection system 1 according to this embodiment, the occupant monitoring apparatus 10 is configured to monitor externally observable data such as expression, behavior, and biological data of an occupant.

Non-limiting examples of the occupant monitoring data to be obtained mainly from the occupant monitoring apparatus 10 may include "behavior" and "biological data". Non-limiting examples of "behavior" may include a gaze direction, a facial pose, the number of blinks, an eye aperture, an eye movement, a posture, and a body motion. Non-limiting examples of "biological data" may include a bloodstream, a pulse rate, a respiration rate, sleeping time, a sleeping state, the number of times an occupant turns over in their sleep, and resting time.

For example, the eye aperture serves as an indication of detection of an occupant dozing. The number of blinks serves as an indication of detection of, for example, a degree of asthenopia and shortage of sleeping time. The eye movement serves as an indication of detection of, for example, the sleeping state of an occupant.

The determination apparatus 100 is configured to determine whether the vehicle is in a traveling state or a stopped state.

For example, the determination apparatus 100 may acquire ignition data from an unillustrated CPU (Central Processing Unit) of the vehicle. In a case where ignition is in an ON state, the determination apparatus 100 may determine that the vehicle is in the traveling state. In a case where the ignition is in an OFF state, the determination apparatus 100 may determine that the vehicle is in the stopped state. The description that the ignition is in the ON state means a power switch of the vehicle is in an ON state. The description that the ignition is in the OFF state means the power switch of the vehicle is in an OFF state. Note that, the power switch is called a power source switch or a main switch.

The determination apparatus 100 may further monitor, for example, a vehicle speed pulse and an operation state of a parking brake. On the basis of the vehicle speed pulse and the operation state of the parking brake together with the ON and OFF states of the ignition, the determination apparatus 100 may determine whether the vehicle is in the traveling state or the stopping state.

The occupant state detection apparatus 200 is configured to receive, from the determination apparatus 100, the determination data, i.e., data regarding whether the vehicle is in the traveling state or the stopped state. On the basis of the determination data from the determination apparatus 100, the occupant state detection apparatus 200 is configured to compare the occupant monitoring data received from the occupant monitoring apparatus 10 with the traveling-state comparative data in the case where the vehicle is in the traveling state, and compare the occupant monitoring data received from the occupant monitoring apparatus 10 with the stopped-state comparative data in the case where the vehicle is in the stopped state. Thus, the occupant state detection apparatus 200 is configured to detect the state of the occupant in the vehicle.

<Configuration of Occupant State Detection Apparatus 200>

Figure 3:
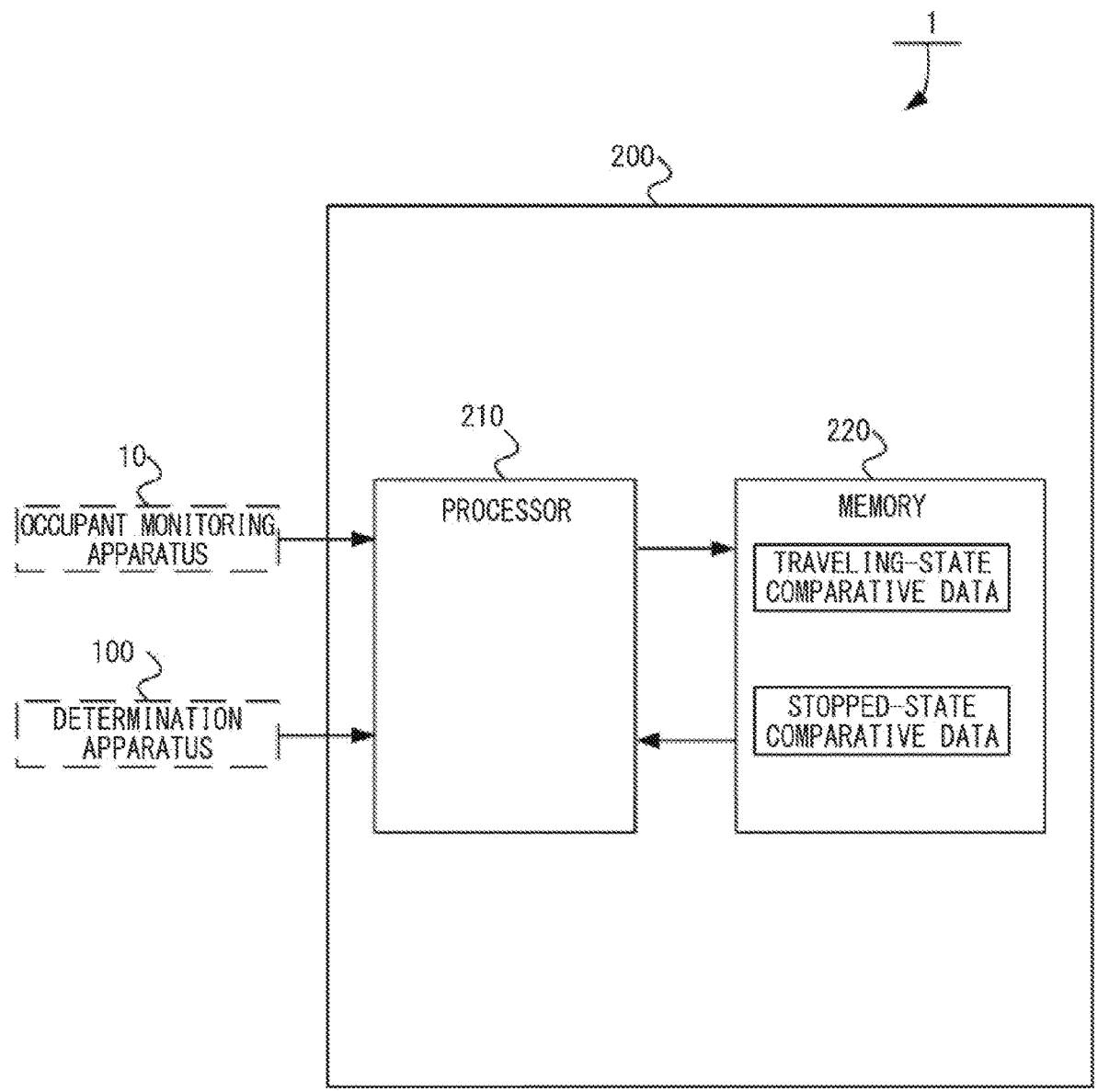
FIG. 3 is a block diagram illustrating a configuration of the occupant state detection apparatus in the occupant state detection system according to the first embodiment of the disclosure.

As illustrated in FIG. 3, the occupant state detection apparatus 200 according to this embodiment may include, without limitation, a processor 210 and a memory 220.

The processor 210 is configured to cooperate with one or more control programs included in the memory 220 described later, to control an entirety of the occupant state detection apparatus 200.

The processor 210 is configured to receive, from the determination apparatus 100, the data regarding whether the vehicle is in the traveling state or the stopped state. The processor 210 is configured to receive the occupant monitoring data from the occupant monitoring apparatus 10, and compare the received occupant monitoring data with the traveling-state comparative data or the stopped-state comparative data, to detect the physical state of the occupant. The traveling-state comparative data and the stopped-state comparative data may be stored in the memory 220 described below.

The memory 220 may include, without limitation, a ROM (Read Only Memory) and/or a RAM (Random Access Memory). The ROM may store, for example, the control program as mentioned above. The RAM may store, for example, various data.

In this embodiment, for example, the occupant monitoring data and other pieces of data received from the occupant monitoring apparatus 10 may be stored in the memory 220.

The traveling-state comparative data includes comparative data to be referred to by the processor 210 to detect the physical state of the occupant in the case where the vehicle is in the traveling state.

The stopped-state comparative data includes comparative data to be referred to by the processor 210 to detect the physical state of the occupant in the case where the vehicle is in the stopped state.

In one example, the traveling-state comparative data includes data relating to, for example, the behavior and the biological data of the occupant at normal times in the case where the vehicle is in the traveling state. The stopped-state comparative data includes data relating to, for example, the behavior and the biological data of the occupant at normal times in the case where the vehicle is in the stopped state. The traveling-state comparative data and the stopped-state comparative data may be stored in the memory 220.

The processor 210 is configured to compare the occupant monitoring data received from the occupant monitoring apparatus 10 with the traveling-state comparative data or the stopped-state comparative data, to detect the physical state, e.g., abnormal behavior or biological data, of an occupant in the traveling state or the stopped state of the vehicle.

<Processing in Occupant State Detection System 1>

Figure 4:
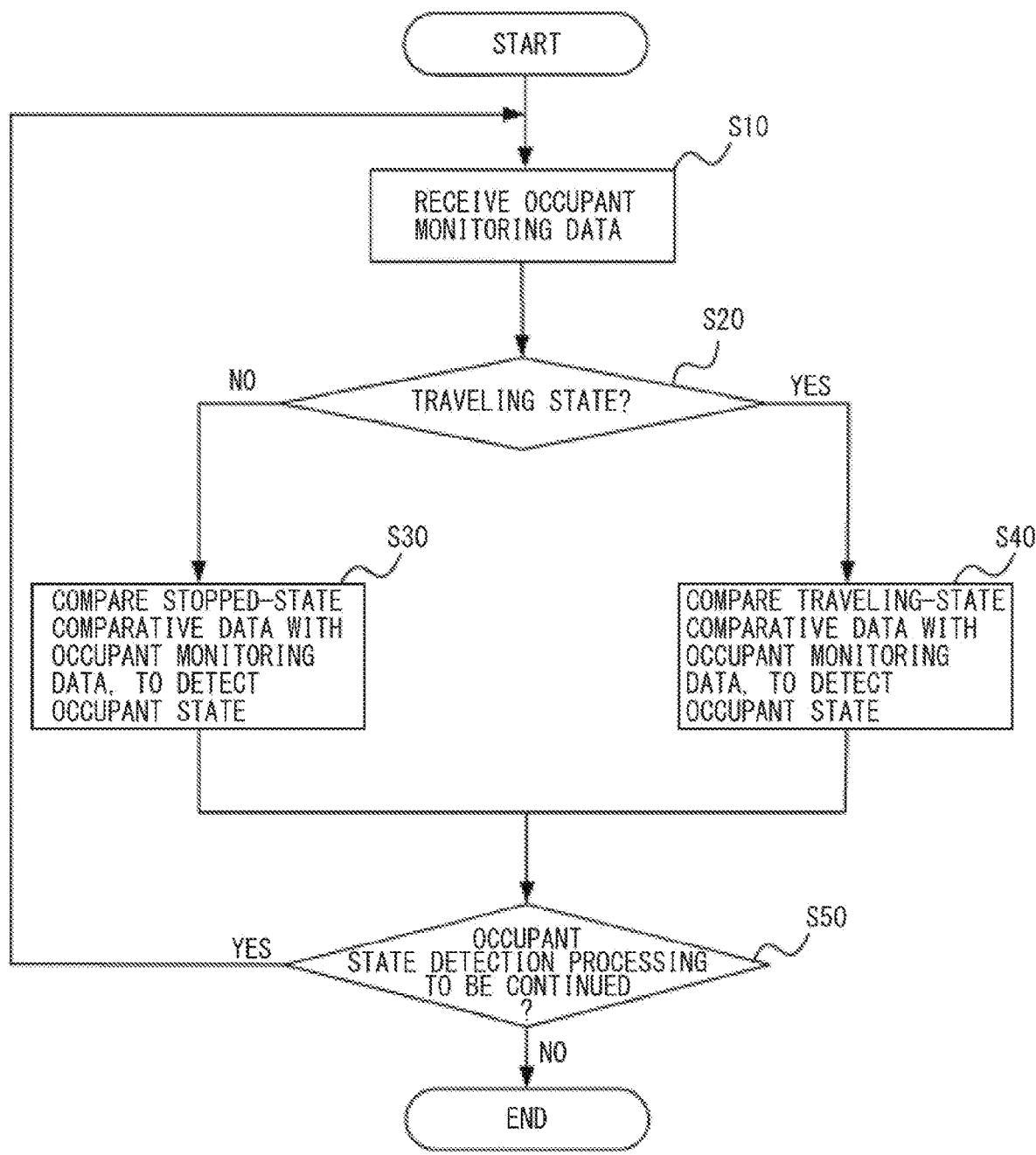
FIG. 4 is a flowchart of processing in the occupant state detection system according to the first embodiment of the disclosure.

Processing in the occupant state detection system 1 according to this embodiment is described with reference to FIG. 4.

The processor 210 may receive the occupant monitoring data from the occupant monitoring apparatus 10 and store the received occupant monitoring data in the memory 220 (step S10).

The processor 210 may determine whether or not the processor 210 has received data indicating that the vehicle is in the traveling state, or that the ignition is in the ON state, from the determination apparatus 100 (step S20).

In a case where the processor 210 determines that the processor 210 has not received the data indicating that the vehicle is in the traveling state, or that the ignition is in the ON state ("NO" in step S20), the processor 210 may determine that the vehicle is in the stopped state, and cause the processing to proceed to step S30.

The processor 210 may compare the received occupant monitoring data with the stopped-state comparative data stored in the memory 220, to detect the state of the occupant (step S30).

In one example, the processor 210 may compare the occupant monitoring data, e.g., "biological data" such as "bloodstream, pulse rate, and respiration rate", with the stopped-state comparative data, to detect, for example, an abnormality in the body of the occupant.

In a case where the processor 210 determines that the processor 210 has received the data indicating that the vehicle is in the traveling state, or that the ignition is in the ON state ("YES" in step S20), the processor 210 may cause the processing to proceed to step S40.

The processor 210 may compare the occupant monitoring data received from the occupant monitoring apparatus 10 with the traveling-state comparative data stored in the memory 220, to detect the state of the occupant (step S40).

In one example, the processor 210 may compare the occupant monitoring data, e.g., "behavior" such as "gaze direction, facial pose, number of blinks, eye aperture, eye movement, posture, and body motion", with the traveling-state comparative data, to detect the occupant looking aside, dozing, being fatigued, and/or having an abnormal state in, for example, the posture.

The processor 210 may determine whether or not to continue occupant state detection processing (step S50).

In a case where the processor 210 determines that the occupant state detection processing is to be continued ("YES" in step S50), the processor 210 may cause the processing to return to step S10, and continue the occupant state detection processing.

In a case where the processor 210 determines that the occupant state detection processing is not to be continued ("NO" in step S50), the processor 210 may end the occupant state detection processing.

<Workings and Effects>

As described above, the occupant state detection system 1 according to this embodiment includes the occupant monitoring apparatus 10, the determination apparatus 100, and the occupant state detection apparatus 200. The occupant monitoring apparatus 10 is configured to monitor the physical state of the occupant in the vehicle. The determination apparatus 100 is configured to determine whether the vehicle is in the traveling state or the stopped state. The occupant state detection apparatus 200 is configured to detect the state of the occupant in the vehicle on the basis of the occupant monitoring data from the occupant monitoring apparatus 10. The occupant state detection apparatus 200 includes the processor 210 and the memory 220. The memory 220 is configured to be communicably coupled to the processor 210. The memory 220 is configured to store the traveling-state comparative data and the stopped-state comparative data. The traveling-state comparative data includes the comparative data to detect the state of the occupant in the vehicle in the traveling state. The stopped-state comparative data includes the comparative data to detect the state of the occupant in the vehicle in the stopped state. The processor 210 is configured to cooperate with the one or more programs included in the memory 220 to: receive the occupant monitoring data and the determination data from the determination apparatus 100; store the received occupant monitoring data in the memory 220; and on the basis of the determination data, compare the occupant monitoring data with the traveling-state comparative data in the case where the vehicle is in the traveling state, and compare the occupant monitoring data with the stopped-state comparative data in the case where the vehicle is in the stopped state, to detect the state of the occupant in the vehicle.

That is, in the occupant state detection system 1 according to this embodiment, on the basis of the determination data regarding whether the vehicle is in the traveling state or the stopped state, the comparison is made between the occupant monitoring data from the occupant monitoring apparatus 10 and the traveling-state comparative data or the stopped-state comparative data, to detect the physical state of the occupant.

This leads to optimization of a monitoring method in the stopped state and a monitoring method in the traveling state in the detection of the physical state of the occupant. Hence, it is possible to accurately detect the physical state of the occupant.

Moreover, in the occupant state detection system 1 according to this embodiment, the determination apparatus 100 may acquire the ignition data. In the case where the ignition is in the OFF state, the determination apparatus 100 may transmit the determination data indicating that the vehicle is in the stopped state, to the processor 210. In the case where the ignition is in the ON state, the determination apparatus 100 may transmit the determination data indicating that the vehicle is in the traveling state, to the processor 210.

In other words, the determination apparatus 100 may determine whether the vehicle is in the traveling state or the stopped state on the basis of whether the ignition is in the ON state or the OFF state.

Hence, it is possible for the occupant state detection system 1 to determine uniquely whether the vehicle is in the traveling state or the stopped state, without using a special sensor, etc.

Furthermore, in the occupant state detection system 1 according to this embodiment, the occupant monitoring apparatus 10 may include the camera configured to capture the image of the occupant in the vehicle. The occupant monitoring apparatus 10 may acquire the occupant monitoring data including the behavior and the biological data of the occupant in the vehicle, and transmit the occupant monitoring data to the processor 210.

That is, in the occupant state detection system 1, the occupant monitoring apparatus 10 is allowed to acquire the occupant monitoring data in consideration of characteristics of the built-in camera, to detect the physical state of the occupant. The occupant monitoring data includes the behavior and the biological data of the occupant in the vehicle.

This makes it possible for the occupant state detection system 1 to obtain highly accurate data regarding, for example, the behavior and the biological data of the occupant in the vehicle. Hence, it is possible to enhance accuracy of the detection of the physical state of the occupant in the vehicle.

In addition, in the case with the camera including both the optical camera and the near-infrared camera, it is possible to capture the image of the occupant day and night. Hence, it is possible to grasp accurately the physical state of the occupant in the traveling state and the stopped state of the vehicle at any time.

Second Embodiment

An occupant state detection system 1A according to a second embodiment is described with reference to FIGS. 5 to 8.

It is to be noted that constituent elements denoted by the same reference characters as those of the first embodiment have similar functions, and therefore detailed description thereof is omitted.

<Configuration of Occupant State Detection System 1A>

Figure 5:
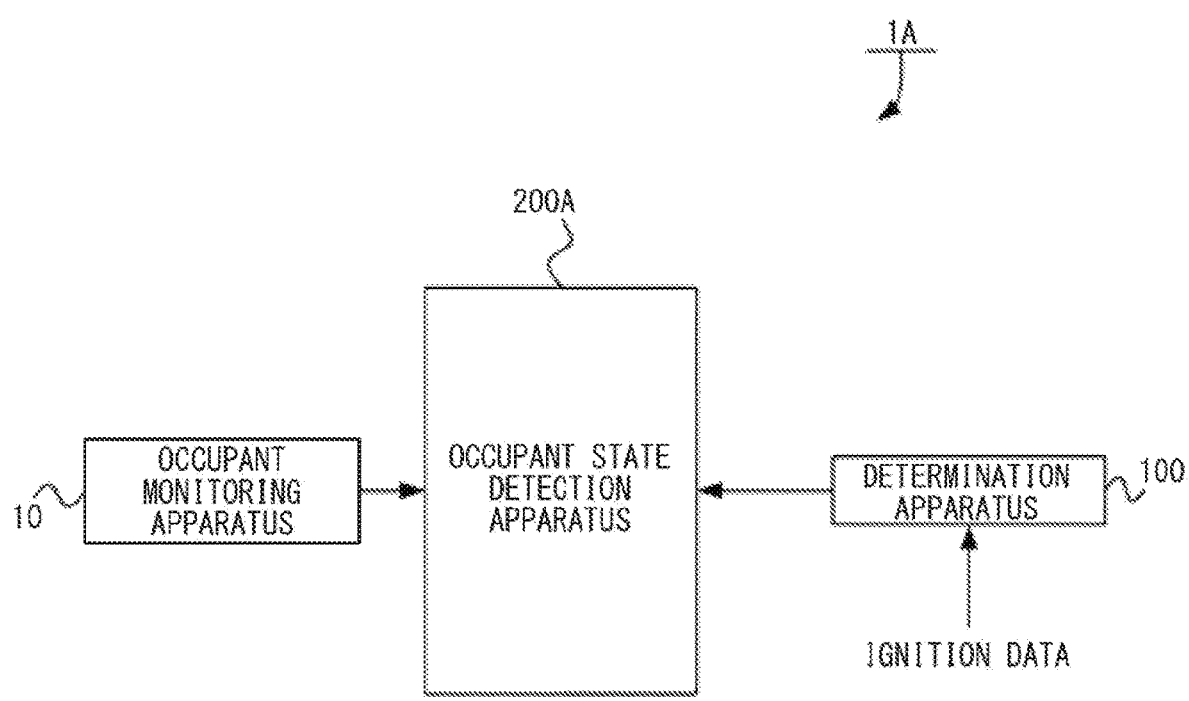
FIG. 5 is a block diagram illustrating a configuration of an occupant state detection system according to a second embodiment of the disclosure.

As illustrated in FIG. 5, the occupant state detection system 1A according to this embodiment may include, without limitation, the occupant monitoring apparatus 10, the determination apparatus 100, and an occupant state detection apparatus 200A.

<Configuration of Occupant State Detection Apparatus 200A>

Figure 6:
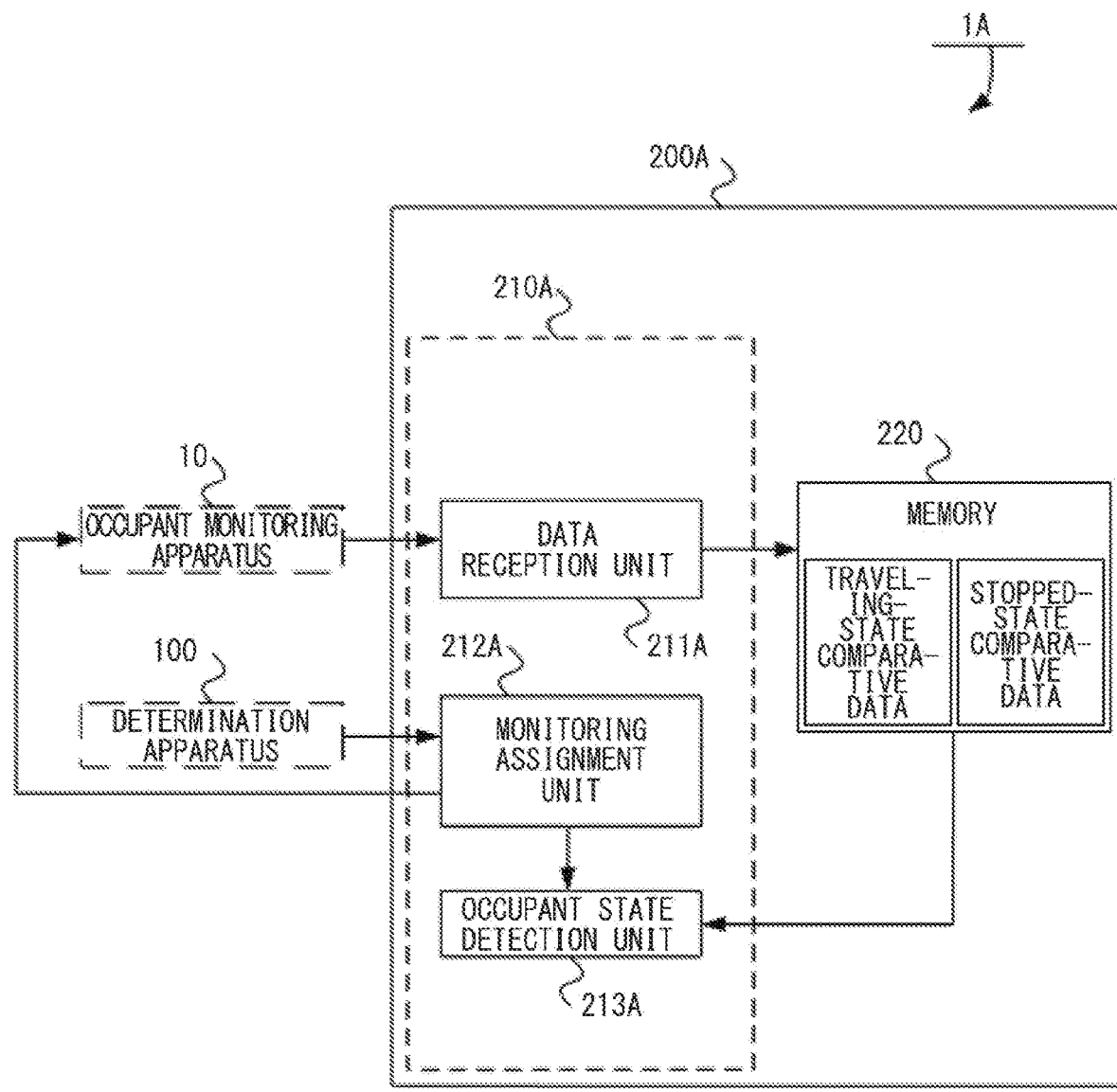
FIG. 6 is a block diagram illustrating a configuration of an occupant state detection apparatus in the occupant state detection system according to the second embodiment of the disclosure.

As illustrated in FIG. 6, the occupant state detection apparatus 200A according to this embodiment may include, without limitation, a processor 210A and the memory 220.

The processor 210A is configured to cooperate with the one or more control programs included in the memory 220, to control an entirety of the occupant state detection apparatus 200A.

Moreover, in this embodiment, in one example, the processor 210A is configured to serve as, for example, a data reception unit 211A, a monitoring assignment unit 212A, and an occupant state detection unit 213A described later.

<Configuration of Processor 210A>

As illustrated in FIG. 6, the processor 210A according to this embodiment may include, without limitation, the data reception unit 211A, the monitoring assignment unit 212A, and the occupant state detection unit 213A.

The data reception unit 211A may receive the occupant monitoring data from the occupant monitoring apparatus 10, and store the received occupant monitoring data in the memory 220.

The monitoring assignment unit 212A may receive the determination data from the determination apparatus 100, and make assignment of a monitoring target to be monitored by the occupant monitoring apparatus 10.

In one example, as summarized in FIG. 7, in a case where the monitoring assignment unit 212A has received the determination data indicating that the vehicle is in the traveling state from the determination apparatus 100, the monitoring assignment unit 212A may assign, for example, "occupant behavior" to the monitoring target to be monitored by the occupant monitoring apparatus 10 (assignment processing A).

That is, in the case where the vehicle is in the traveling state, for example, "occupant behavior" may be assigned to the monitoring target to be monitored by the occupant monitoring apparatus 10, to detect, for example, an abnormal posture of the occupant. Thus, the occupant monitoring data such as "gaze direction, facial pose, number of blinks, eye aperture, eye movement, posture, and body motion", without limitation, may be transmitted to the data reception unit 211A.

In a case where the monitoring assignment unit 212A has received the determination data indicating that the vehicle is in the stopped state from the determination apparatus 100, the monitoring assignment unit 212A may assign, for example, "occupant biological data" to the monitoring target to be monitored by the occupant monitoring apparatus 10 (assignment processing B).

That is, in the case where the vehicle is in the stopped state, occupants may lie down, for example, sleeping or resting. This may hinder the occupant monitoring apparatus 10 from acquiring facial data.

Accordingly, for example, "occupant biological data" may be assigned to the monitoring target to be monitored by the occupant monitoring apparatus 10. Thus, for example, the occupant monitoring data such as "bloodstream, pulse rate, and respiration rate" may be transmitted to the data reception unit 211A.

Moreover, the monitoring assignment unit 212A may transmit the determination data received from the determination apparatus 100 to the occupant state detection unit 213A.

On the basis of the determination data received from the monitoring assignment unit 212A, the occupant state detection unit 213A may compare the occupant monitoring data from the occupant monitoring apparatus 10 stored in the memory 220 with the traveling-state comparative data or the stopped-state comparative data, to detect the physical state of the occupant.

In one example, in the case where the occupant state detection unit 213A has received the determination data indicating that the vehicle is in the traveling state from the monitoring assignment unit 212A, the occupant state detection unit 213A may compare, for example, the occupant monitoring data indicating "occupant behavior" such as "gaze direction, facial pose, number of blinks, eye aperture, eye movement, posture, and body motion" as mentioned above, with the traveling-state comparative data corresponding to the relevant occupant monitoring data, to detect the occupant looking aside, dozing, being fatigued, and/or having an abnormal state in, for example, the posture.

In the case where the occupant state detection unit 213A has received the determination data indicating that the vehicle is in the stopped state from the monitoring assignment unit 212A, the occupant state detection unit 213A may compare, for example, the occupant monitoring data indicating "occupant biological data" such as "bloodstream, pulse rate, and respiration rate" as mentioned above, with the stopped-state comparative data corresponding to the relevant occupant monitoring data, to detect, for example, an abnormality in the body of the occupant.

<Processing in Occupant State Detection System 1A>

Figure 8:
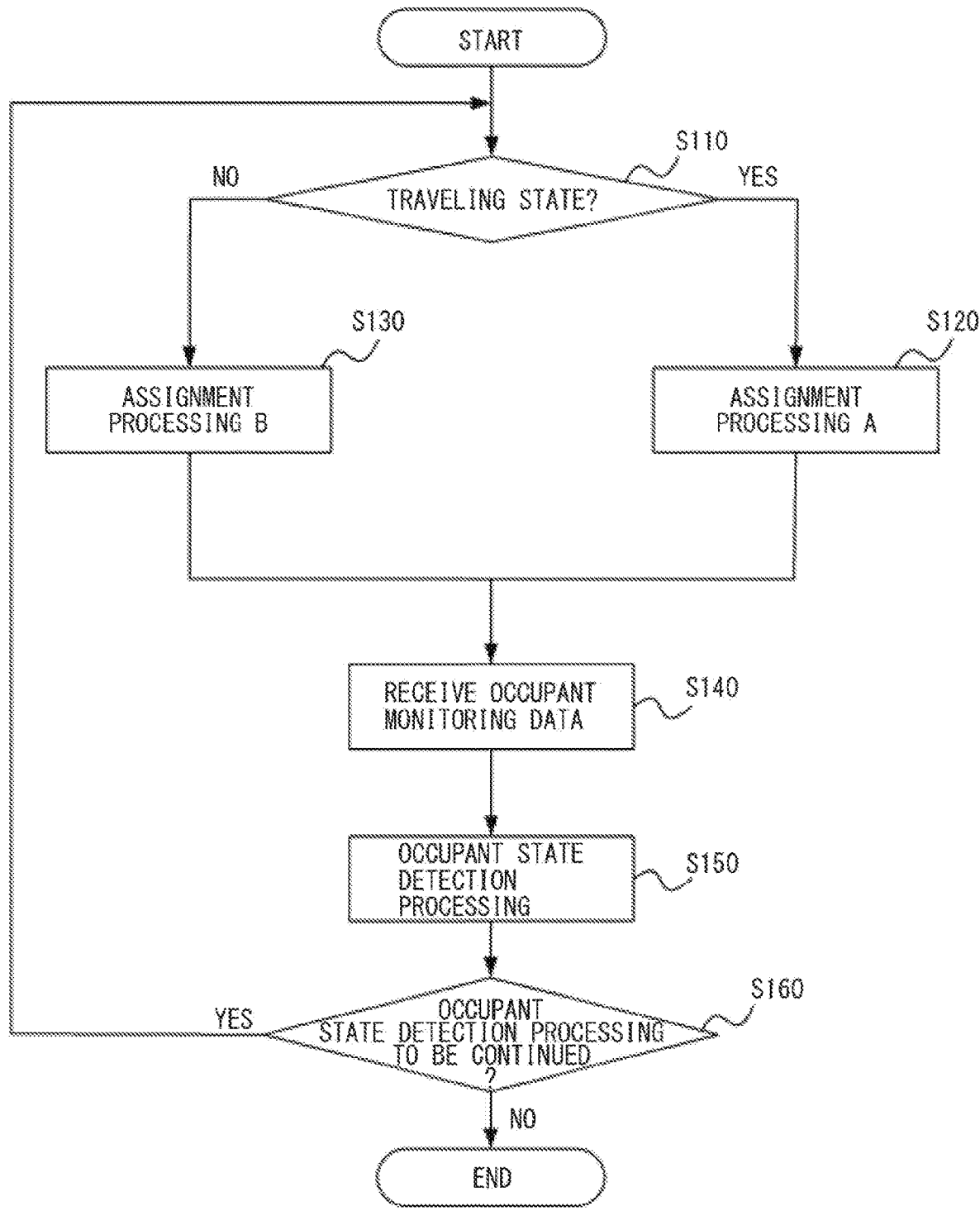
FIG. 8 is a flowchart of processing in the occupant state detection system according to the second embodiment of the disclosure.

Processing in the occupant state detection system 1A according to this embodiment is described with reference to FIG. 8.

The monitoring assignment unit 212A of the processor 210A may determine whether or not the monitoring assignment unit 212A has received the data indicating that the vehicle is in the traveling state, or that the ignition is in the ON state, from the determination apparatus 100 (step S110).

In a case where the monitoring assignment unit 212A determines that the monitoring assignment unit 212A has received the data indicating that the vehicle is in the traveling state, or that the ignition is in the ON state ("YES" in step S110), the monitoring assignment unit 212A may carry out the assignment processing A (step S120).

In the assignment processing A (step S120), the monitoring assignment unit 212A may assign, for example, "occupant behavior" to the monitoring target to be monitored by the occupant monitoring apparatus 10. The monitoring assignment unit 212A may transmit a signal of such assignment to the occupant monitoring apparatus 10, and cause the processing to proceed to step S140.

In a case where the monitoring assignment unit 212A determines that the monitoring assignment unit 212A has not received the data indicating that the vehicle is in the traveling state, or that the ignition is in the ON state ("NO" in step S110), the monitoring assignment unit 212A may determine that the vehicle is in the stopped state, and carry out the assignment processing B (step S130).

In the assignment processing B (step S130), the monitoring assignment unit 212A may assign, for example, "occupant biological data" to the monitoring target to be monitored by the occupant monitoring apparatus 10. The monitoring assignment unit 212A may transmit a signal of such assignment to the occupant monitoring apparatus 10, and cause the processing to proceed to step S140.

Here, after the assignment processing A (step S120) or the assignment processing B (step S130) in the monitoring assignment unit 212A is carried out, the processor 210A may permit the occupant monitoring apparatus 10 that has been already started up to output data to the data reception unit 211A.

Alternatively, after the assignment processing A (step S120) or the assignment processing B (step S130) in the monitoring assignment unit 212A is carried out, the processor 210A may permit the data reception unit 211A to receive the occupant monitoring data from the occupant monitoring apparatus 10.

In another alternative, after the assignment processing A (step S120) or the assignment processing B (step S130) in the monitoring assignment unit 212A is carried out, the processor 210A may permit the data reception unit 211A to write, to the memory 220, the occupant monitoring data from the occupant monitoring apparatus 10.

The data reception unit 211A may receive the occupant monitoring data from the occupant monitoring apparatus 10 provided with the assignment of the monitoring target by the monitoring assignment unit 212A. The data reception unit 211A may store the occupant monitoring data received from the occupant monitoring apparatus 10, in the memory 220 (step S140).

The occupant state detection unit 213A may compare the occupant monitoring data from the occupant monitoring apparatus 10 stored in the memory 220, with the traveling-state comparative data or the stopped-state comparative data corresponding to the relevant occupant monitoring data stored in the memory 220, to detect, for example, the physical state of the occupant (step S150).

In one example, in the case where, for example, the occupant state detection unit 213A has received the determination data indicating that the vehicle is in the traveling state from the monitoring assignment unit 212A, the occupant state detection unit 213A may compare, for example, the occupant monitoring data indicating "occupant behavior" such as "gaze direction, facial pose, number of blinks, eye aperture, eye movement, posture, and body motion" with the traveling-state comparative data corresponding to the relevant occupant monitoring data, to detect the occupant looking aside, dozing, being fatigued, and/or having an abnormal state in, for example, the posture.

In the case where the occupant state detection unit 213A has received the data indicating that the vehicle is in the stopped state from the monitoring assignment unit 212A, the occupant state detection unit 213A may compare, for example, the occupant monitoring data indicating "occupant biological data" such as "bloodstream, pulse rate, and respiration rate" with the stopped-state comparative data corresponding to the relevant occupant monitoring data, to detect, for example, an abnormality in the body of the occupant.

The processor 210A may determine whether or not to continue the occupant state detection processing (step S160).

In a case where the processor 210A determines that the occupant state detection processing is to be continued ("YES" in step S160), the processor 210A may cause the processing to return to step S110, and continue the occupant state detection processing.

In a case where the processor 210A determines that the occupant state detection processing is not to be continued ("NO" in step S160), the processor 210A may end the occupant state detection processing.

<Workings and Effects>

As described above, in the occupant state detection system 1A according to this embodiment, in the case with the determination data indicating that the vehicle is in the traveling state, the processor 210A may assign the behavior of the occupant in the vehicle to the monitoring target to be monitored by the occupant monitoring apparatus 10. In the case with the determination data indicating that the vehicle is in the stopped state, the processor 210A may assign the biological data of the occupant in the vehicle to the monitoring target.

That is, on the basis of the determination data from the determination apparatus 100, the processor 210A may assign the behavior of the occupant in the vehicle to the monitoring target in the case where the vehicle is in the traveling state, and assign the biological data of the occupant in the vehicle to the monitoring target in the case where the vehicle is in the stopped state.

This leads to the optimization of the monitoring method in the stopped state and the monitoring method in the traveling state in the detection of the physical state of the occupant. Hence, it is possible to accurately detect the physical state of the occupant.

Moreover, in the occupant state detection system 1A according to this embodiment, in the case where the vehicle is in the stopped state, "occupant biological data" may be assigned to the monitoring target to be monitored by the occupant monitoring apparatus 10, instead of "occupant behavior". This is because, in the case where the vehicle is in the stopped state, the occupant monitoring apparatus 10 is not able to monitor the face of the occupant sleeping or taking a rest.

Hence, it is possible for the occupant state detection system 1A to detect accurately the physical state of the occupant even in the case where the vehicle is in the stopped state.

Furthermore, in the occupant state detection system 1A according to this embodiment, in the case where the vehicle is in the traveling state, "occupant behavior" may be assigned to the monitoring target to be monitored by the occupant monitoring apparatus 10.

That is, in the occupant state detection system 1A, in the case where the vehicle is in the traveling state, the occupant monitoring data such as "gaze direction, facial pose, number of blinks, eye aperture, eye movement, posture, and body motion" of the occupant may be compared with the traveling-state comparative data corresponding to the relevant occupant monitoring data. Hence, it is possible to detect immediately the occupant looking aside, dozing, being fatigued, and/or having a serious state in, for example, the posture while the vehicle is traveling.

Third Embodiment

Figure 11:
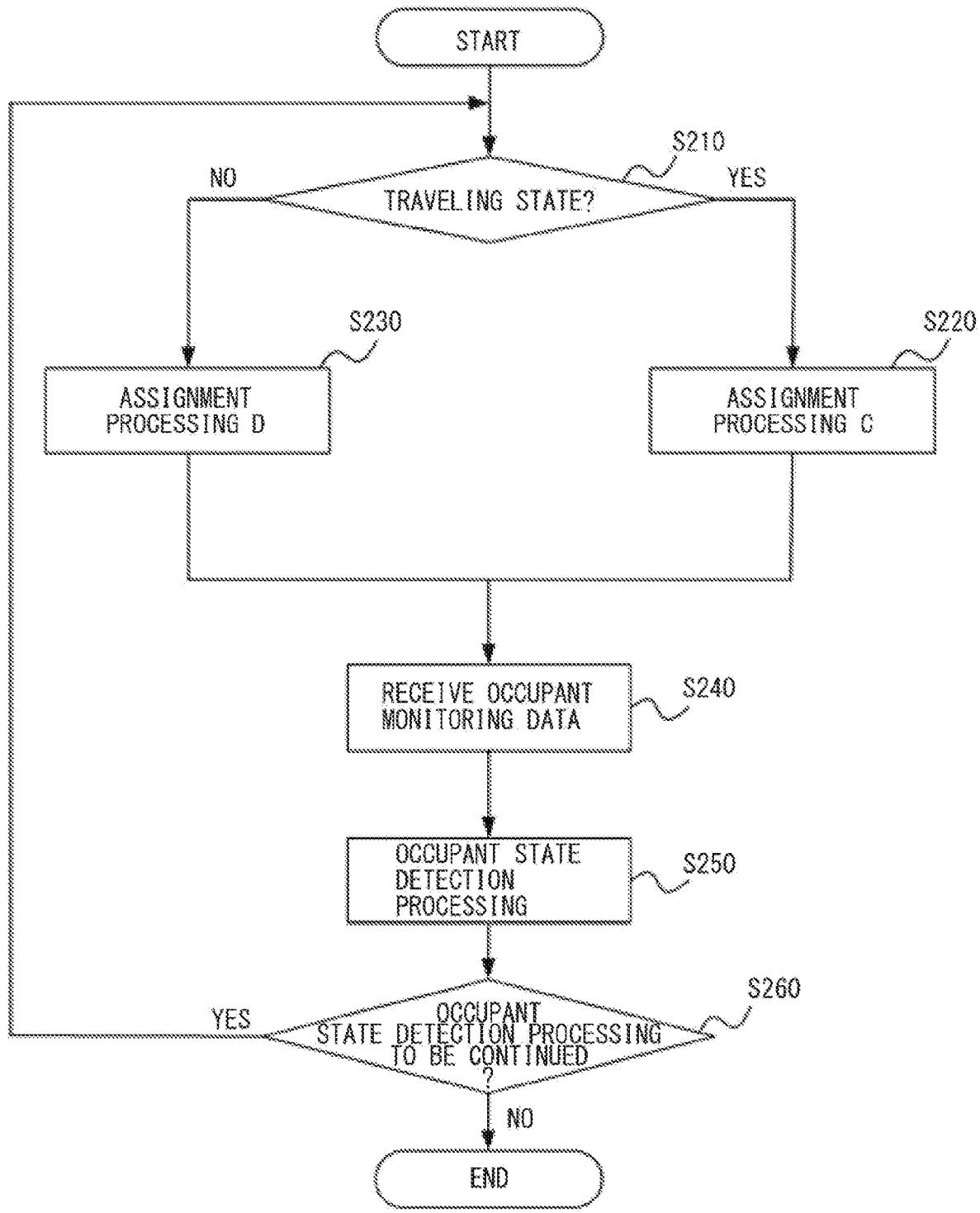
FIG. 11 is a flowchart of processing in the occupant state detection system according to the third embodiment of the disclosure.

An occupant state detection system 1B according to a third embodiment is described with reference to FIGS. 9 to 11.

It is to be noted that constituent elements denoted by the same reference characters as those of the first and second embodiments have similar functions, and therefore detailed description thereof is omitted.

<Configuration of Occupant State Detection System 1B>

Figure 9:
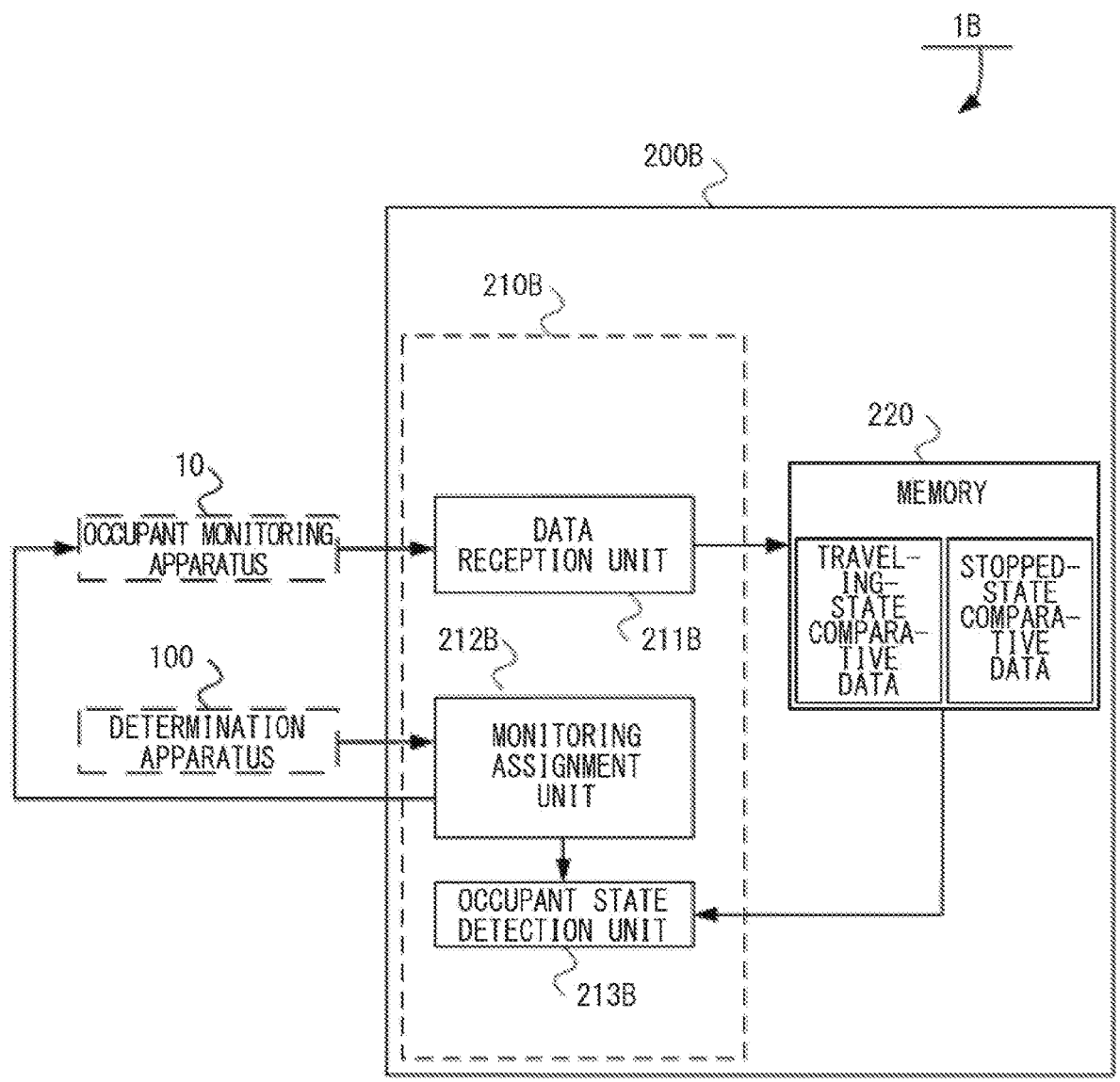
FIG. 9 is a block diagram illustrating a configuration of an occupant state detection apparatus in an occupant state detection system according to a third embodiment of the disclosure.

As illustrated in FIG. 9, the occupant state detection system 1B according to this embodiment may include, without limitation, the occupant monitoring apparatus 10, the determination apparatus 100, and an occupant state detection apparatus 200B.

The occupant state detection apparatus 200B may make the assignment of the monitoring target to be monitored by the occupant monitoring apparatus 10 in a case where the occupant state detection apparatus 200B has received the data indicating that the vehicle is in the traveling state or the stopped state from the determination apparatus 100.

The occupant state detection apparatus 200B may receive the occupant monitoring data from the occupant monitoring apparatus 10 provided with the assignment of the monitoring target. The occupant state detection apparatus 200B may compare the occupant monitoring data with the traveling-state comparative data or the stopped-state comparative data corresponding to the relevant occupant monitoring data, to detect the physical state of the occupant.

<Configuration of Occupant State Detection Apparatus 200B>

As illustrated in FIG. 9, the occupant state detection apparatus 200B according to this embodiment may include, without limitation, a processor 210B and the memory 220.

The processor 210B is configured to cooperate with the one or more control programs included in the memory 220 to control an entirety of the occupant state detection apparatus 200B.

Moreover, in this embodiment, in one example, the processor 210B is configured to serve as, for example, a data reception unit 211B, a monitoring assignment unit 212B, and an occupant state detection unit 213B described later.

<Configuration of Processor 210B>

As illustrated in FIG. 9, the processor 210B according to this embodiment may include, without limitation, the data reception unit 211B, the monitoring assignment unit 212B, and the occupant state detection unit 213B.

The data reception unit 211B may receive the occupant monitoring data from the occupant monitoring apparatus 10 provided with the assignment of the monitoring target by the monitoring assignment unit 212B. The data reception unit 211B may store the received occupant monitoring data in the memory 220.

The monitoring assignment unit 212B may receive the determination data from the determination apparatus 100, and make the assignment of the monitoring target to be monitored by the occupant monitoring apparatus 10.

In one example, as summarized in FIG. 10, in a case where the monitoring assignment unit 212B has received the determination data indicating that the vehicle is in the traveling state from the determination apparatus 100, the monitoring assignment unit 212B may assign "occupant on driver's seat" to the monitoring target to be monitored by the occupant monitoring apparatus 10 (assignment processing C).

That is, in the case where the vehicle is in the traveling state, the monitoring assignment unit 212B may assign the occupant on the driver's seat to the monitoring target to be monitored by the occupant monitoring apparatus 10, to detect the occupant seated on the driver's seat taking an abnormal posture, dozing, and/or looking aside.

In a case where the monitoring assignment unit 212B has received the determination data indicating that the vehicle is in the stopped state from the determination apparatus 100, the monitoring assignment unit 212B may assign "occupant inside whole cabin" to the monitoring target to be monitored by the occupant monitoring apparatus 10 (assignment processing D).

That is, in the case where the vehicle is in the stopped state, the monitoring assignment unit 212B may assign the occupant inside the whole cabin to the monitoring target to be monitored by the occupant monitoring apparatus 10, to monitor the state of every occupant in the cabin.

Moreover, the monitoring assignment unit 212B may transmit the determination data received from the determination apparatus 100 to the occupant state detection unit 213B.

On the basis of the determination data received from the monitoring assignment unit 212B, the occupant state detection unit 213B may compare the occupant monitoring data from the occupant monitoring apparatus 10 stored in the memory 220 with the traveling-state comparative data or the stopped-state comparative data corresponding to the relevant occupant monitoring data, to detect the physical state of the occupant.

In one example, in the case where the occupant state detection unit 213B has received the determination data indicating that the vehicle is in the traveling state from the monitoring assignment unit 212B, the occupant state detection unit 213B may compare, for example, the occupant monitoring data such as "gaze direction, facial pose, eye aperture, number of blinks, eye movement, posture, and body motion" of the occupant seated on the driver's seat, with the traveling-state comparative data corresponding to the relevant occupant monitoring data, as mentioned above, to detect, for example, the occupant seated on the driver's seat looking aside, dozing, and/or being fatigued.

Moreover, in the case where the occupant state detection unit 213B has received the determination data indicating that the vehicle is in the stopped state from the monitoring assignment unit 212B, the occupant state detection unit 213B may compare, for example, the occupant monitoring data such as "posture and body motion" of the occupant inside the whole cabin with the stopped-state comparative data corresponding to the relevant occupant monitoring data, as mentioned above, to detect the state of every occupant in the vehicle, e.g., dozing, taking a certain posture, using a mobile phone, watching television, smoking, eating, drinking, and/or having conversation.

<Processing in Occupant State Detection System 1B>

Processing in the occupant state detection system 1B according to this embodiment is described with reference to FIG. 11.

The monitoring assignment unit 212B of the processor 210B may determine whether or not the monitoring assignment unit 212B has received the data indicating that the vehicle is in the traveling state, or that the ignition is in the ON state, from the determination apparatus 100 (step S210).

In a case where the monitoring assignment unit 212B determines that the monitoring assignment unit 212B has received the data indicating that the vehicle is in the traveling state, or that the ignition is in the ON state ("YES" in step S210), the monitoring assignment unit 212B may carry out the assignment processing C (step S220).

In the assignment processing C (step S220), the monitoring assignment unit 212B may assign "occupant on driver's seat" to the monitoring target to be monitored by the occupant monitoring apparatus 10. The monitoring assignment unit 212B may transmit a signal of such assignment to the occupant monitoring apparatus 10.

In a case where the monitoring assignment unit 212B determines that the monitoring assignment unit 212B has not received the data indicating that the vehicle is in the traveling state, or that the ignition is in the ON state ("NO" in the step S210), the monitoring assignment unit 212B may determine that the vehicle is in the stopped state, and carry out the assignment processing D (step S230).

In the assignment processing D (step S230), the monitoring assignment unit 212B may assign "occupant inside whole cabin" to the monitoring target to be monitored by the occupant monitoring apparatus 10. The monitoring assignment unit 212B may transmit a signal of such assignment to the occupant monitoring apparatus 10.

After the monitoring assignment unit 212B carries out the assignment processing C (step S220) or the assignment processing D (step S230), the data reception unit 211B may receive the occupant monitoring data from the occupant monitoring apparatus 10 provided with the assignment of the monitoring target by the monitoring assignment unit 212B. The data reception unit 211B may store the received occupant monitoring data in the memory 220 (step S240).

The occupant state detection unit 213B may compare the occupant monitoring data from the occupant monitoring apparatus 10 stored in the memory 220 with the traveling-state comparative data or the stopped-state comparative data corresponding to the relevant occupant monitoring data, to detect, for example, the physical state of the occupant (step S250).

That is, in the case where the occupant state detection unit 213B has received the determination data indicating that the vehicle is in the traveling state from the monitoring assignment unit 212B, the occupant state detection unit 213B may compare, for example, the occupant monitoring data such as "gaze direction, facial pose, eye aperture, number of blinks, eye movement, posture, and body motion" of the occupant seated on the driver's seat, with the traveling-state comparative data corresponding to the relevant occupant monitoring data, to detect the state of the occupant seated on the driver's seat, e.g., sleeping, being fatigued, driving inadvertently, having emotions, and/or feeling stressed.

In the case where the occupant state detection unit 213B has received the determination data indicating that the vehicle is in the stopped state from the monitoring assignment unit 212B, the occupant state detection unit 213B may compare, for example, the occupant monitoring data such as "posture and body motion" of the occupant inside the whole cabin with the stopped-state comparative data corresponding to the relevant occupant monitoring data, to detect the state of every occupant in the vehicle, e.g., dozing, taking a certain posture, using a mobile phone, watching television, smoking, eating, drinking, and/or having conversation.

Thereafter, the processor 210B may determine whether or not to continue the occupant state detection processing (step S260).

In a case where the processor 210B determines that the occupant state detection processing is to be continued ("YES" in step S260), the processor 210B may cause the processing to return to step S210, and continue the occupant state detection processing.

In a case where the processor 210B determines that the occupant state detection processing is not to be continued ("NO" in step S260), the processor 210B may end the occupant state detection processing.

<Workings and Effects>

As described above, in the occupant state detection system 1B according to this embodiment, the processor 210B may assign the occupant on the driver's seat to the monitoring target to be monitored by the occupant monitoring apparatus 10 in the case with the determination data indicating that the vehicle is in the traveling state. The processor 210B may assign the occupant inside the whole cabin to the monitoring target in the case with the determination data indicating that the vehicle is in the stopped state.

That is, in the occupant state detection system 1B, the processor 210B may assign the occupant inside the whole cabin to the monitoring target in the case where the vehicle is in the stopped state because the driver may move in the cabin.

Hence, in the case where the vehicle is in the stopped state, it is possible to detect the physical state of every occupant in the vehicle.

Moreover, in the occupant state detection system 1B according to this embodiment, in the case where the vehicle is in the traveling state, the processor 210B may acquire the occupant monitoring data such as "gaze direction, facial pose, eye aperture, number of blinks, eye movement, posture, and body motion" to detect an abnormal state of the driver. The processor 210B may compare the acquired occupant monitoring data with the traveling-state comparative data.

Hence, in the case where the vehicle is in the traveling state, it is possible to immediately detect, for example, the driver of the vehicle looking aside, dozing, being fatigued, and/or driving inadvertently.

Fourth Embodiment

Figure 14:
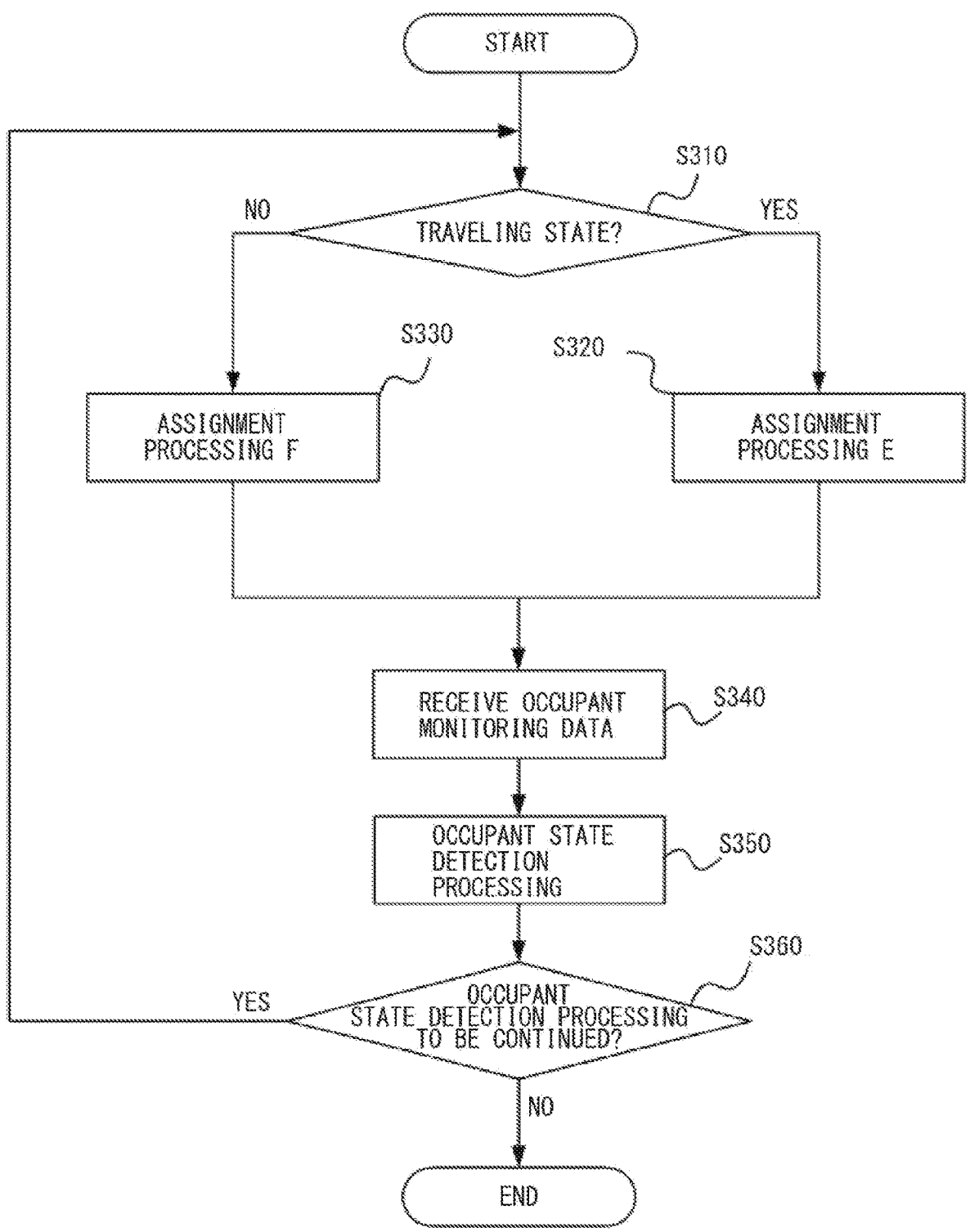
FIG. 14 is a flowchart of processing in the occupant state detection system according to the fourth embodiment of the disclosure.

An occupant state detection system 1C according to a fourth embodiment is described with reference to FIGS. 12 to 14.

<Configuration of Occupant State Detection System 1C>

Figure 12:
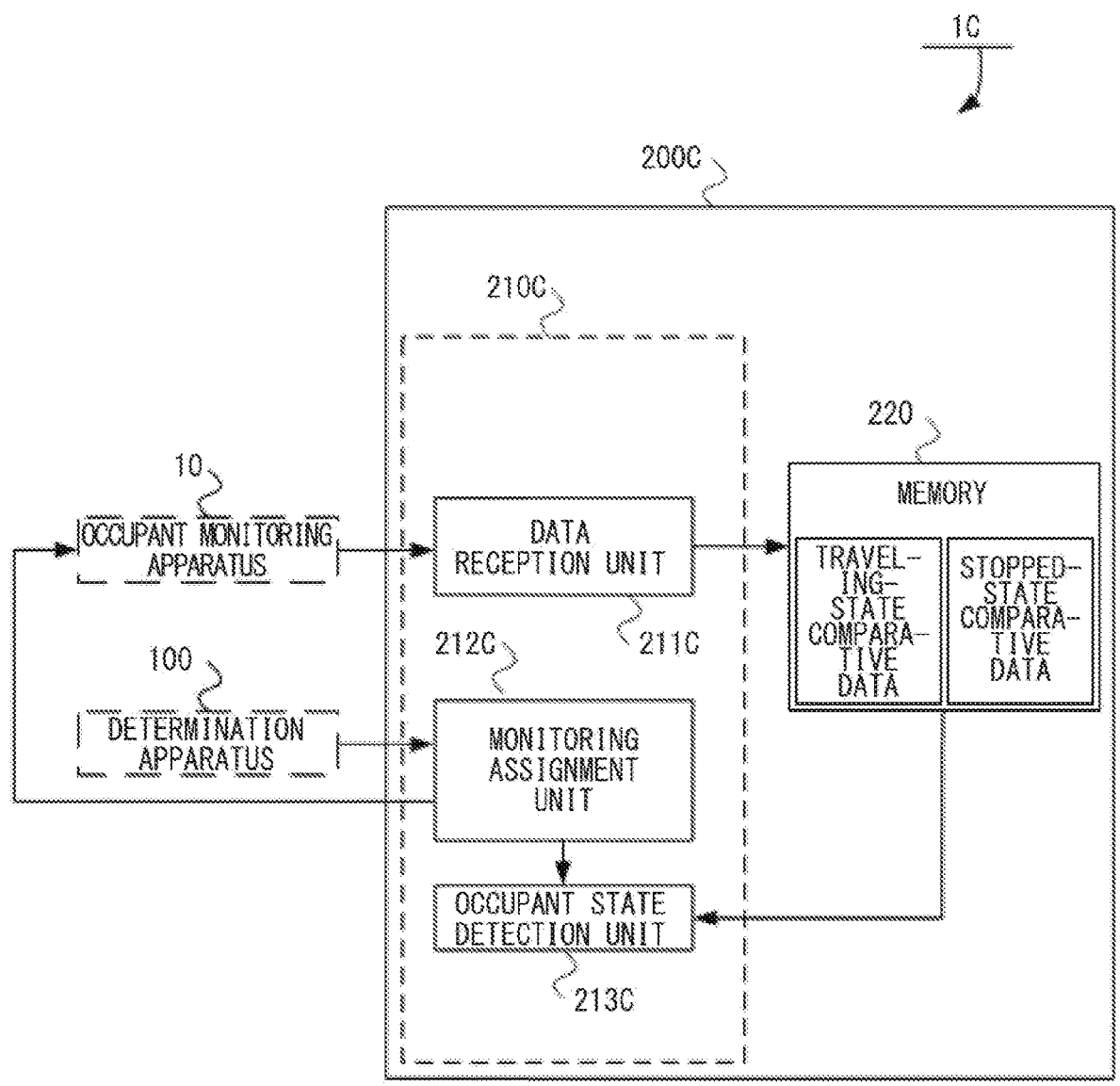
FIG. 12 is a block diagram illustrating a configuration of an occupant state detection apparatus in an occupant state detection system according to a fourth embodiment of the disclosure.

As illustrated in FIG. 12, the occupant state detection system 1C according to this embodiment may include, without limitation, the occupant monitoring apparatus 10, the determination apparatus 100, and an occupant state detection apparatus 200C.

It is to be noted that constituent elements denoted by the same reference characters as those of the first to third embodiments have similar functions, and therefore detailed description thereof is omitted.

The occupant state detection apparatus 200C may make the assignment of the monitoring target of the occupant in the vehicle to be monitored by the occupant monitoring apparatus 10 in the case where the occupant state detection apparatus 200C has received the data indicating that the vehicle is in the traveling state or the stopped state from the determination apparatus 100.

The occupant state detection apparatus 200C may receive the occupant monitoring data from the occupant monitoring apparatus 10 provided with the assignment of the monitoring target of the occupant. The occupant state detection apparatus 200C may compare the occupant monitoring data with the traveling-state comparative data or the stopped-state comparative data corresponding to the relevant occupant monitoring data, to detect the physical state of the occupant.

<Configuration of Occupant State Detection Apparatus 200C>

As illustrated in FIG. 12, the occupant state detection apparatus 200C according to this embodiment may include, without limitation, a processor 210C and the memory 220.

The processor 210C is configured to cooperate with the one or more control programs included in the memory 220 to control an entirety of the occupant state detection apparatus 200C.

Moreover, in this embodiment, in one example, the processor 210C is configured to serve as, for example, a data reception unit 211C, a monitoring assignment unit 212C, and an occupant state detection unit 213C described later.

<Configuration of Processor 210C>

As illustrated in FIG. 12, the processor 210C according to this embodiment may include, without limitation, the data reception unit 211C, the monitoring assignment unit 212C, and the occupant state detection unit 213C.

The data reception unit 211C may receive the occupant monitoring data from the occupant monitoring apparatus 10 provided with the assignment of the monitoring target by the monitoring assignment unit 212C. The data reception unit 211C may store the received occupant monitoring data in the memory 220.

The monitoring assignment unit 212C may receive the determination data from the determination apparatus 100. On the basis of the determination data, the monitoring assignment unit 212C may make the assignment of the monitoring target of the occupant in the vehicle to be monitored by the occupant monitoring apparatus 10.

In one example, as illustrated in FIG. 13, in a case where the monitoring assignment unit 212C has received the determination data indicating that the vehicle is in the traveling state from the determination apparatus 100, the monitoring assignment unit 212C may assign "occupant behavior and biological data" to the monitoring target to be monitored by the occupant monitoring apparatus 10 (assignment processing E).

That is, in the case where the vehicle is in the traveling state, the monitoring assignment unit 212C may assign "occupant behavior and biological data" to the monitoring target to be monitored by the occupant monitoring apparatus 10, to detect an external state and an internal state of the occupant. The external state is a state of an occupant that is to be determined by the behavior of the occupant, e.g., dozing or looking aside. The internal state is a state of an occupant that is not to be determined solely by the behavior of the occupant, e.g., feeling stressed, having emotions, and/or driving inadvertently.

Moreover, in a case where the monitoring assignment unit 212C has received the data indicating that the vehicle is in the stopped state from the determination apparatus 100, the monitoring assignment unit 212C may assign "occupant behavior" to the monitoring target to be monitored by the occupant monitoring apparatus 10 (assignment processing F).

That is, in the case where the vehicle is in the stopped state, the monitoring assignment unit 212C may assign "occupant behavior" to the monitoring target to be monitored by the occupant monitoring apparatus 10, to detect the external state of the occupant, e.g., dozing, looking aside, using a mobile phone, watching television, smoking, eating, drinking, and/or having conversation.

Furthermore, the monitoring assignment unit 212C may transmit the determination data received from the determination apparatus 100 to the occupant state detection unit 213C.

On the basis of the determination data received from the monitoring assignment unit 212C, the occupant state detection unit 213C may compare the occupant monitoring data from the occupant monitoring apparatus 10 stored in the memory 220 with the traveling-state comparative data or the stopped-state comparative data corresponding to the relevant occupant monitoring data, to detect the physical state of the occupant.

In one example, in the case where the occupant state detection unit 213C has received the determination data indicating that the vehicle is in the traveling state from the monitoring assignment unit 212C, the occupant state detection unit 213C may compare, for example, the occupant monitoring data such as "gaze direction, facial pose, eye aperture, number of blinks, eye movement, posture, body motion, bloodstream, pulse rate, and respiration rate" with the traveling-state comparative data corresponding to the relevant occupant monitoring data, to detect the state of the occupant, e.g., being drowsy, driving inadvertently, having emotions, feeling stressed, looking aside, dozing, using a mobile phone, watching television, smoking, eating, drinking, and/or having conversation.

Moreover, in the case where the occupant state detection unit 213C has received the data indicating that the vehicle is in the stopped state from the monitoring assignment unit 212C, the occupant state detection unit 213C may compare, for example, the occupant monitoring data such as "gaze direction, facial pose, eye aperture, number of blinks, eye movement, posture, and body motion" with the stopped-state comparative data corresponding to the relevant occupant monitoring data, to detect the state of the occupant, e.g., looking aside, dozing, using a mobile phone, watching television, smoking, eating, drinking, and/or having conversation.

<Processing in Occupant State Detection System 1C>

Processing in the occupant state detection system 1C according to this embodiment is described with reference to FIG. 14.

The monitoring assignment unit 212C of the processor 210C may determine whether or not the monitoring assignment unit 212C has received the data indicating that the vehicle is in the traveling state, or that the ignition is in the ON state, from the determination apparatus 100 (step S310).

At this occasion, in the case where the monitoring assignment unit 212C determines that the monitoring assignment unit 212C has received the data indicating that the vehicle is in the traveling state, or that the ignition is in the ON state ("YES" in step S310), the processor 210C may cause the processing to proceed to step S320, and carry out the assignment processing E (step S320).

As described, in the assignment processing E (step S320), the monitoring assignment unit 212C may assign "occupant behavior and biological data" to the monitoring target to be monitored by the occupant monitoring apparatus 10. The monitoring assignment unit 212C may transmit a signal of such assignment to the occupant monitoring apparatus 10.

In the case where the monitoring assignment unit 212C of the processor 210C determines that the monitoring assignment unit 212C has not received the data indicating that the vehicle is in the traveling state, or that the ignition is in the ON state ("NO" in step S310), the monitoring assignment unit 212C may determine that the vehicle is in the stopped state, and cause the processing to proceed to step S330, and carry out the assignment processing F (step S330).

As described, in the assignment processing F (step S330), the monitoring assignment unit 212C may assign "occupant behavior" to the monitoring target to be monitored by the occupant monitoring apparatus 10. The monitoring assignment unit 212C may transmit a signal of such assignment to the occupant monitoring apparatus 10.

After the assignment processing E (step S320) or the assignment processing F (step S330) is carried out by the monitoring assignment unit 212C, the data reception unit 211C may receive the occupant monitoring data from the occupant monitoring apparatus 10 provided with the assignment of the monitoring target by the monitoring assignment unit 212C. The data reception unit 211C may store the received occupant monitoring data in the memory 220 (step S340).

The occupant state detection unit 213C may compare the occupant monitoring data from the occupant monitoring apparatus 10 stored in the memory 220 with the traveling-state comparative data or the stopped-state comparative data corresponding to the relevant occupant monitoring data, to detect, for example, the physical state of the occupant (step S350).

That is, in the case where the occupant state detection unit 213C has received the determination data indicating that the vehicle is in the traveling state from the monitoring assignment unit 212C, the occupant state detection unit 213C may compare the occupant monitoring data such as "gaze direction, facial pose, eye aperture, number of blinks, eye movement, posture, body motion, bloodstream, pulse rate, and respiration rate" with the traveling-state comparative data, to detect the state of the occupant such as being drowsy, driving inadvertently, having emotions, feeling stressed, looking aside, dozing, using a mobile phone, watching television, smoking, eating, drinking, and/or having conversation.

Moreover, in the case where the occupant state detection unit 213C has received the determination data indicating that the vehicle is in the stopped state from the monitoring assignment unit 212C, the occupant state detection unit 213C may compare the occupant monitoring data such as "gaze direction, facial pose, eye aperture, number of blinks, eye movement, posture, and body motion" with the stopped-state comparative data, to detect the state of the occupant, e.g., looking aside, dozing, using a mobile phone, watching television, smoking, eating, drinking, and/or having conversation.

The processor 210C may determine whether or not to continue the occupant state detection processing (step S360).

In a case where the processor 210C determines that the occupant state detection processing is to be continued ("YES" in step S360), the processor 210C may cause the processing to return to step S310, and continue the occupant state detection processing.

In a case where the processor 210C determines that the occupant state detection processing is not to be continued ("NO" in step S360), the processor 210C may end the occupant state detection processing.

<Workings and Effects>

As described above, in the occupant state detection system 1C according to this embodiment, the processor 210C may assign the behavior and the biological data of the occupant in the vehicle to the monitoring target to be monitored by the occupant monitoring apparatus 10 in the case with the determination data indicating that the vehicle is in the traveling state, and assign the behavior of the occupant in the vehicle to the monitoring target in the case with the determination data indicating that the vehicle is in the stopped state.

That is, in the case where the vehicle is in the traveling state, the occupant state detection system 1C may monitor the behavior and the biological data of the occupant, to detect immediately the occupant being in a serious state while driving.

Monitoring the behavior and the biological data of the occupant makes it possible to detect the internal state of the occupant, e.g., feeling stressed, being drowsy, having emotions, driving inadvertently, and being fatigued. The internal state of the occupant is not to be determined solely by the behavior, i.e., the external state, of the occupant.

Moreover, it is possible to detect the serious physical state of the occupant while the vehicle is traveling. This makes it possible to provide the occupant with information to give the occupant an alarm or urge the occupant to take a rest.

Furthermore, in the occupant state detection system 1C according to this embodiment, in the case where the vehicle is in the stopped state, the physical state of the occupant in the vehicle may be detected on the basis of "occupant behavior". This is because, in the case where the vehicle is in the stopped state, it is unnecessary to detect immediately the serious state of the occupant, e.g., feeling stressed, being drowsy, having emotions, driving inadvertently, and/or being fatigued.

This leads to the optimization of the monitoring method in the stopped state and the monitoring method in the traveling state. Hence, it is possible to detect accurately the physical state of the occupant.

Modification Examples

In the occupant state detection systems 1, 1A, 1B, and 1C described above, the occupant monitoring apparatus 10 including the camera is configured to monitor the physical state of the occupant. Alternatively, the occupant state detection system 1, 1A, 1B, and 1C may further include an occupant monitoring apparatus including millimeter wave radar, to monitor the physical state of the occupant.

Millimeter-wave radar is able to detect an object, and measure a distance to the detected object, a horizontal angle of the object, and a relative speed of the object by radio waves of short wavelengths. Providing the occupant state detection systems 1, 1A, 1B, and 1C with the occupant monitoring apparatus including millimeter-wave radar makes it possible to acquire "biological data" in detail, e.g., the heart rate, the heart rate variability, the respiration rate, and the brain wave.

In other words, millimeter-wave radar is suitable for obtaining the biological data that is difficult to determine from the external state, or the behavior, of the occupant, e.g., biological data for monitoring, for example, a health state of the occupant. Monitoring the occupant using millimeter-wave radar makes it possible to grasp the physical state of the occupant in more detail.

Furthermore, in the second to fourth embodiments, an alternative configuration may be possible in which the data from the occupant monitoring apparatus 10 may be transferred to a server coupled to the vehicle, to allow the server to carry out the processing by the monitoring assignment units 212A, 212B, and 212C, and the occupant state detection units 213A, 213B, and 214C.

This makes it possible to process many pieces of data quickly. Hence, it is possible to detect accurately, for example, the physical state of the occupant in the traveling state and the stopped state of the vehicle.

The occupant state detection systems 1, 1A, 1B, and 1C of the example embodiments of the disclosure may be realized by recording the processing by the processors 210, 210A, 210B, and 210C in a recording medium readable by a computer system, and by causing the processor 210, 210A, 210B, and 210C to read and execute a program stored in the recording medium. A computer system as used herein includes an operating system and hardware such as peripheral devices.

In the case with the use of the WWW (World Wide Web) system, the "computer system" also includes an environment that provides and/or displays a website. The program may be transmitted from the computer system in which the program is stored in a storage device, etc., to another computer system through a transmission medium or by a transmission wave in the transmission medium. Here, the "transmission medium" that transmits the program refers to a medium configured to transmit data, e.g., a network (communication network) such as the Internet or a communication line such as a telephone line.

Furthermore, the program as mentioned above may be one that realizes a portion of the processing described above.

In addition, the program may be a so-called differential file, or a differential program, that is able to realize the processing described above by a combination with a program already stored in the computer system.

Although some example embodiments of the technology have been described in the forgoing by way of example with reference to the accompanying drawings, the technology is by no means limited to the example embodiments described above. It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

Each of the processors 210, 210A, 210B, and 210C illustrated in FIGS. 3, 6, 9, and 12 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the processors 210, 210A, 210B, and 210C illustrated in FIGS. 3, 6, 9, and 12. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the processors 210, 210A, 210B, and 210C illustrated in FIGS. 3, 6, 9, and 12.

The invention claimed is:

1. An occupant state detection system comprising:
   an occupant monitoring apparatus configured to monitor a physical state of an occupant in a vehicle;
   a determination apparatus configured to determine whether the vehicle is in a traveling state or a stopped state; and
   an occupant state detection apparatus configured to detect a state of the occupant in the vehicle on a basis of occupant monitoring data from the occupant monitoring apparatus, wherein
   the occupant state detection apparatus includes
      one or more processors, and
      one or more memories configured to be communicably coupled to the one or more processors, the one or more memories are configured to store 1) first reference data that is behavioral criteria for determining behavior of the occupant, and 2) second reference data that is biological criteria for determining an abnormality in a body of the occupant, the first reference data differs from the second reference data, the one or more processors are configured to cooperate with one or more programs included in the one or more memories to while the vehicle is in the traveling state, compare the occupant monitoring data with the first reference data, and determine the behavior of the occupant based on comparing the occupant monitoring data with the first reference data, and when detecting that the vehicle is in the stopped state, switch criteria for determining the behavior of the occupant from the first reference data to the second reference data, compare the occupant monitoring data with the second reference data, and determine an abnormality in the body of the occupant based on comparing the occupant monitoring data with the second reference data.

2. The occupant state detection system according to claim 1, wherein the determination apparatus is configured to acquire ignition data whether ignition in an ON state or an OFF state in the vehicle, transmit, to the one or more processors, first determination data indicating that the vehicle is in the stopped state, on a condition that ignition is in the OFF state, and transmit, to the one or more processors, second determination data indicating that the vehicle is in the traveling state, on a condition that the ignition is in the ON state.

3. The occupant state detection system according to claim 1, wherein the occupant monitoring apparatus includes a camera configured to capture an image of the occupant in the vehicle, and the occupant monitoring apparatus is configured to acquire the occupant monitoring data and transmit the occupant monitoring data to the one or more processors, the occupant monitoring data including behavior and biological data of the occupant in the vehicle.

4. The occupant state detection system according to claim 3, wherein on a condition that first determination data from the determination apparatus indicates that the vehicle is in the stopped state, the one or more processors are configured to assign the biological data of the occupant in the vehicle to a monitoring target to be monitored by the occupant monitoring apparatus, and on a condition that second determination data from the determination apparatus indicates that the vehicle is in the traveling state, the one or more processors are configured to assign the behavior of the occupant in the vehicle to the monitoring target.

5. The occupant state detection system according to claim 3, wherein the occupant comprises a plurality of occupants inside a whole cabin of the vehicle, on a condition that first determination data from the determination apparatus indicates that the vehicle is in the stopped state, the one or more processors are configured to assign the plurality of occupants to a monitoring target to be monitored by the occupant monitoring apparatus, and on a condition that second determination data from the determination apparatus indicates that the vehicle is in the traveling state, the one or more processors are configured to assign one of the occupants that is seated on a driver's seat of the vehicle to the monitoring target.

6. The occupant state detection system according to claim 3, wherein on a condition that first determination data from the determination apparatus indicates that the vehicle is in the stopped state, the one or more processors are configured to assign the behavior of the occupant in the vehicle to a monitoring target to be monitored by the occupant monitoring apparatus, and on a condition that the determination data indicates that the vehicle is in the traveling state, the one or more processors are configured to assign the behavior and the biological data of the occupant in the vehicle to the monitoring target.

\* \* \* \* \*